United States Patent [19]

Inoue

[11] 4,321,451
[45] Mar. 23, 1982

[54] SERVO SYSTEM AND METHOD FOR CONTROLLING THE GAP SPACING BETWEEN A TOOL AND WORKPIECE ELECTRODES IN AN EDM MACHINE

[75] Inventor: Kiyoshi Inoue, Tokyo, Japan

[73] Assignee: Inoue-Japax Research Incorporated, Yokohama, Japan

[21] Appl. No.: 161,389

[22] Filed: Jun. 24, 1980

[30] Foreign Application Priority Data

Jun. 21, 1979 [JP] Japan ............................. 54-78379
Jul. 13, 1979 [JP] Japan ............................. 54-89439

[51] Int. Cl.³ ........................................... B23P 1/12
[52] U.S. Cl. .................................. 219/69 G; 318/603; 219/69 C
[58] Field of Search ............ 318/603, 571; 219/69 G, 219/69 C, 69 S

[56] References Cited

U.S. PATENT DOCUMENTS

| | | | |
|---|---|---|---|
| 4,039,779 | 8/1977 | Ruppert | 219/69 G |
| 4,057,703 | 11/1977 | Pfau | 219/69 G |
| 4,071,729 | 1/1978 | Bell, Jr. | 219/69 G |
| 4,150,275 | 4/1979 | Wavre | 219/69 G |
| 4,185,184 | 1/1980 | Pfau | 219/69 C |

Primary Examiner—B. Dobeck
Attorney, Agent, or Firm—Karl F. Ross

[57] ABSTRACT

An improved servo system and method in an EDM machine for controlling the relative electrode displacement or the gap spacing between a tool electrode and a workpiece, wherein the electrodes are brought to a machining position to permit a succession of electrical discharges to be developed therebetween across the machining gap. A counter is used to count the number of machining pulses and, when the number reaches a value preset in conjunction with the machining area defined by the confronting electrodes, to provide an "advance" or "advance-enabling" signal. Only upon development of this signal or concurrent development of it and a usual servo "advance" signal from a gap sensor/servo signal generator responsive to a gap variable, e.g. gap voltage, a servo drive circuit acting on a motor or actuator for driving the movable electrode is actuated to allow the electrode to be advanced or stepped forward to a next machining position. The preset level of the discharge counter is varied from one value to another in response to a change in the machining area, setting or gap condition during the course of the machining operation.

18 Claims, 4 Drawing Figures

SERVO SYSTEM AND METHOD FOR CONTROLLING THE GAP SPACING BETWEEN A TOOL AND WORKPIECE ELECTRODES IN AN EDM MACHINE

FIELD OF THE INVENTION

The present invention relates to electrical discharge machining (EDM) and, more particularly, to a servo system and method for controlling the gap spacing between a tool electrode and a workpiece electrode or the relative electrode displacement in an EDM machine.

BACKGROUND OF THE INVENTION

The EDM process makes use of electroerosive power pulses applied between a workpiece and tool electrode spaced apart in juxtaposed relation across an electrode gap flooded generally with a dielectric liquid (e.g. kerosine or distilled water) which also serves to carry away the detritus of the electrical discharge machining process.

The tool electrode is generally formed with the desired configuration of the cavity or shape complementarily desired in the workpiece. A train of power pulses is then formed to create localized and discrete material removal discharges having a tendency to produce cumulatively overlapping craters in the workpiece surface; the total surface juxtaposed with the tool is thus machined uniformly over the parts thereof confronting the tool electrode and receives a configuration conforming to the shape of the tool electrode. In traveling-wire or wire-cut electrical discharge machining (TW-EDM), the tool electrode is formed by a continuous, axially-traveling elongate wire-like electrode and a two- or three-dimensional relative displacement between the wire and workpiece electrodes yields a desired shape or configuration in or on the workpiece.

During the machining operation, small metallic or conductive chips or particles removed from the electrode surface as well as other discharge products such as tar and gases are carried away by the liquid dielectric which floods the gap and is generally circulated therethrough while the tool electrode is advanced relative to the workpiece by a servo system designed to maintain a predetermined gap spacing or to approach the desired gap spacing as accurately as possible. The servo arrangement may also function to respond to gap short-circuiting and arcing conditions to retract the electrode relative to the workpiece thereby removing such conditions.

While various servo techniques have been practiced in the art, they are divided into two classes.

One includes the provision of a fixed reference voltage and derivation of an algebraic difference or combination of the reference voltage with a signal voltage drawn from the gap and representing a preselected gap variable. The result of this algebraic combination of the reference voltage and gap-sensing voltage is an output or control signal which operates a servomotor of the rotary or linear type to displace the movable electrode until this output signal has been reduced to zero or nullified. The direction of displacement of the servomotor is generally determined by the polarity of the output or difference signal and may be an "advance" or "retraction" signal to narrow or widen the gap spacing. The reference voltage is preset at a given value to correspond to a desired gap spacing and generally is fixed over its range of adjustment so that the difference signal and any amplified servomotor-drive signal assume a linear change in magnitude to the sensed gap variable. When these principles are used for electrical discharge machining, they are not always successful and cannot provide optimum results for several reasons including the fact that EDM parameters are essentially nonlinear in terms of the characteristics of the gap. For example, the gap is not a simple resistance between the electrodes which varies linearly in accordance with the width of the gap, because of changes in the composition of the coolant, the presence of particles, polarization, breakdown and other phenomena at the gap, intimately associated with the machining or processing. Furthermore, the response of the electrode system is seldom ideal so that an electrical command or control signal is not always converted linearly into a corresponding mechanical movement; the lack of correspondence of this type is a consequence of static and dynamic inertia, backlash and other factors present in the mechanical system. Hence, between the sensing of the gap condition and the displacement of the movable electrode to compensate and restore the desired gap condition, there is significant nonlinearity which analog sensing and control appears to multiply rather than decrease.

In another class of servo system, a gap detector is provided to derive a substantially continuous or analog signal varying as a function of a gap variable, generally the gap spacing and to feed it to a discriminator having a threshold value and producing an digital output depending upon its relationship to the threshold, i.e. a first digital state when the analog signal exceeds a threshold and a second digital state when the analog signal is below the threshold value. The digital states serve to represent "advance" and "retraction" signals and are employed to control the servomechanism and actuate the latter in a sense or direction determined by the prevalent digital state and to an extent determined by the duration of that state. The threshold may be constituted by one or more values preset on an empirical basis as corresponding to a desired gap spacing when the machining is carried out in an optimum mode or may be automatically adjusted upon monitoring the progress of a given machining operation.

As opposed to the first-mentioned systems, therefore, the servomechanism responsive to the digital state and reversible, i.e. operative to advance or retract the movable electrode in dependence upon the digital state prevalent at the moment, is capable of correcting the position of the movable electrode only upon the formation of an analog signal which exceeds or lies below the corresponding threshold value to create the digital state, the magnitude of which may be substantially independent of the analog output so that the system is free from the inconveniences of linear control arrangements for regulating nonlinear operations. Furthermore, the servo actuator (servo motor) receives only opposite-polarity pulses of variable width but fixed amplitude and relatively sharp flanks or wave fronts, and control pulses vary sharply between a pair of opposing states and thereby sharply energize the servo motor with either of two active conditions depending upon the magnitude of the analog signal derived from the gap and compared or discriminated with respect to the predetermined threshold value. This method of response and actuation provides rapid quenching of any short circuit or arc and rapid recovery of a normal gap such that only spark-type discharges are formed. The system also allows accelerated follow-up feed of the movable electrode after correction of any deficient operation, provides for rapid elimination of the effect of mechanical inertia, and otherwise ensures the rapid movement of the electrode in either direction.

In both types of EDM servo control described in the foregoing, however, the gap sensor or drive circuit acting on a servo actuator or motor for controlling the position of a movable electrode has hitherto been designed in effect to respond solely to changes in one or more gap variables which are extremely sensitive to and eventually dependent on instantaneous changes in gap state, other than the actual or effective gap size, which, due to the dynamic action of gap existents or formations, occur undefinably at one localized zone or another of the entire machining area defined by the confronting electrodes. This has been found to be especially disadvantageous when the servo actuator or motor is to operate in an "advance" or feed-forward mode to narrow the machining gap. The servo sensor or drive circuit may then respond to advance the movable electrode before machining discharges develop thoroughly over the entire machining area or when only a fraction of the machining area develops effective discharges. The result of this premature advance is an insufficient material removal at the previous machining position and the tendency to soon bring about a short-circuiting condition which must be cleared by a subsequent retraction of the movable electrode to follow immediately to return the latter at an optimum position; the retraction and advance cycle is done unnecessarily and must be repeated. Unavoidably, therefore, the operation becomes unstable and machining proceeds with only a limited efficiency.

OBJECTS OF THE INVENTION

It is, accordingly, a principal object of the present invention to provide a servo method and system in an EDM machine which overcome the limitations with regard to both machining stability and efficiency inherent in the earlier methods and systems.

Another object of the invention is to provide an improved EDM servo method and system which can be practiced advantageously in conjunction with an AD (analog-to-digital) conversion type servo generator generally described in the foregoing which provides digitalized "advance" and "retraction" signals in response to a gap variable.

Still another object of the invention is to provide an improved EDM servo system and method which can be practiced with an analog type servo signal generator generally described in the foregoing, advantageously or practically without the drawbacks inherent to the conventional systems of that type.

SUMMARY OF THE INVENTION

In accordance with the present invention there is provided, in a first aspect thereof, a servo method of controlling the gap spacing between a tool electrode and a workpiece electrode, at least one of which is movable, in an EDM machine, the method comprising the steps of: bringing the electrodes to a machining position and permitting a succession of machining discharges to be developed therebetween across a machining gap to remove material from the workpiece electrode; deriving from the machining gap a first signal representing an enlargement of the gap spacing; counting the developed machining discharges and when the counted number reaches a preset value, providing a second signal and, in response to concurrent occurrence of the first and second signals, operating motive means to permit the movable electrode to be advanced from the aforementioned machining position.

Specifically, the first signal may be a usual servo "advance" signal provided while continuously monitoring a gap variable representing an enlargement of the gap spacing resulting from the material removal, the "advance" signal being fed to an energizing circuit for a servo motor or actuator which drives the movable electrode. The second signal is then fed to enable the "advance" signal to be passed to the motor-energizing circuit. Alternatively or stated otherwise, the second signal is used to enable the first signal to be developed representative of the "advance" signal, the developed "advance" signal being fed to the energizing circuit. The latter may provide an analog drive signal when the first signal is continuous or of analog nature for driving the motor or actuator of analog type or a digital drive signal in the form of a pulse or a train of pulses when the first signal is of digital nature for driving the motor or actuator which permits incremental or stepping displacement.

Advantageously, the count level of the counter is varied in a given machining course where the configuration or nature of the tool electrode or the workpiece imposes continuous or successive change in the machining area or the desired machining end requires such change in setting or where a certain type of automatic operation is to be carried out, so that the number of machining discharges secured to occur in each advanced position may adequately vary from one position to another to suit to the particular machining area or setting in each step.

For counting machining discharges, a classification or discrimination is preferably executed to distinguish satisfactory or good machining pulses which each result in an effective material removal discharge from bad or ineffective pulses, e.g. short-circuiting and open-circuit pulses, so that the counting may properly indicate a desired total stock removal over the entire machining area in each advance step.

The invention provides, in a second aspect thereof, a servo system for controlling the gap spacing between a tool electrode and a workpiece electrode, at least one of which is movable by motor means energized by a drive circuit, in an EDM machine including a power supply for passing machining pulses across the gap to effect a succession of electrical discharges between the tool and workpiece electrodes and thereby remove material from the workpiece electrode, the system comprising motor means for bringing the electrodes to a machining position to permit a succession of the electrical discharges to be developed therebetween across the machining gap; gap sensing means for providing a first signal representing an enlargement of the gap spacing resulting from material removal from the workpiece with the electrical discharges; and discharge counter means for counting the electrical discharges; and upon the counted number of electrical discharges reaching a preset level, providing a second signal and circuit means for enabling the development of the first signal with the second signal to apply the developed first signal to the drive circuit, thereby operating the motor means to permit the movable electrode to be advanced from the aforementioned machining position.

BRIEF DESCRIPTION OF DRAWINGS

The invention will now be described in more detail, by way of example, with reference to the accompanying drawings in which.

SPECIFIC DESCRIPTION

Figure 1:
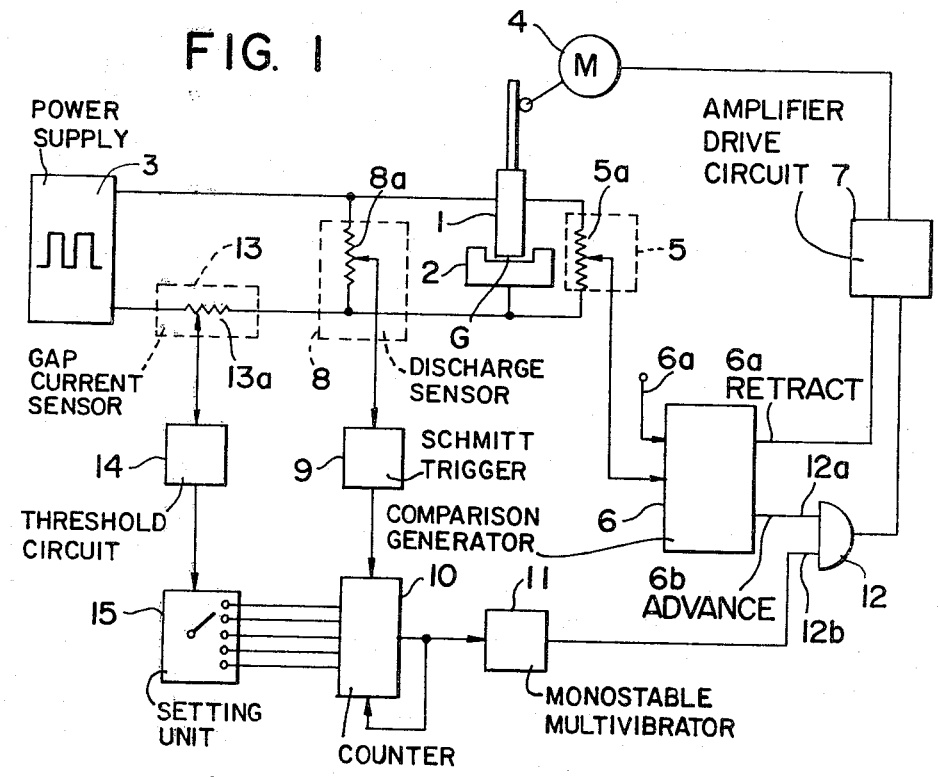
FIG. 1 is a schematic diagram of a system embodying the present invention.

Referring to FIG. 1, there is shown a tool electrode 1 juxtaposed with a workpiece electrode 2 to form a gap or spacing G between them in the presence of a machining liquid. A power supply 3 is connected to the electrodes 1 and 2 to apply a succession of EDM pulses thereacross so that successive time-spaced, discrete electrical discharges are produced through the machining gap G to remove material from the workpiece 2. The EDM power supply 3 may be any one of existing design. One or both of the tool electrode 1 and workpiece electrode 2 is movable (this electrode will be referred to as a movable electrode hereinafter) and is driven by a servomotor 4, which may be a DC motor, stepping motor or hydraulic or pneumatic cylinder arrangement, to maintain the gap G at an optimum spacing with an improved servo system as will fully be described hereinbelow.

The servo system includes a gap sensor 5 for deriving from the machining gap G a usual servo signal representative of the size of the machining gap G. The gap sensor 5 is here represented by an adjustable sensing resistor 5a and may respond to a gap variable (e.g. gap voltage, current, resistance or impedance) on an instantaneous (per pulse) basis or an average basis. The output of the gap sensor 5 leads to a comparison generator or circuit 6 adapted to compare the gap signal with a preset threshold or reference level and, according to the comparison, to issue a "retract" signal at its first output 6a and on "advance" signal at its second output 6b which signals are fed to a servo amplifier/drive circuit 7. The these signals individually may be either a digital pulse which is produced when the gap signal lies below or above preset threshold value to determine the corresponding "retract" or "advance" requirement or an analog signal representing the difference between the gap signal and the reference level in the corresponding direction. The presetting of the threshold or reference value representing a desired size of the machining gap G into the comparison generator 6 is introduced at a setting input 6a thereof. The amplifier/drive circuit 7 is used to amplify each of the "retract" and "advance" signals from the circuit 6 when it occurs and/or to convert it into an appropriate drive signal which is fed along a line 7a to the servo motor or actuator 4 to cause the latter to displace the movable electrode 1 in the corresponding "retract" or "advance" direction so that the desired size of the machining gap G may be maintained. The drive signal may be in either an analog or digital form depending upon the type of the servo motor 4 and, when the latter is a stepping motor or a DC motor equipped with an encoder to allow incremental feed of the movable electrode 1, is a single pulse or a train of successive pulses such that for each incoming pulse the motor is step-driven to feed the electrode 1 by an increment of displacement, say, of 1 micron. Thus, upon each occurrence of "retract" or "advance" signal at the generator 6 output, the movable electrode 1 is capable of accurate displacement in the required direction by a distance which can be determined by the duration of the single pulse, the number of the successive pulses or the time integral of the analog signal furnished by the drive circuit 7. The retraction drive signal furnished by the drive circuit 7 is advantageously followed by a return drive signal which repositions the retracted electrode 1 to a position at which a normal EDM operation may resume.

Across the machining gap G there is also connected a discharge sensor 8, here constituted by a sensing resistor 8a, for developing a sensing signal each time a machining pulse is passed between the tool electrode and the workpiece 2. The adjustable tap 8b of the sensing resistor 8a is connected to feed the sensed voltage signal to a discriminator circuit 9, here constituted by a Schmitt-trigger or any suitable circuit having a threshold level which may be one discriminating a satisfactory or good machining pulse from unsatisfactory or bad machining pulses which may include a short-circuiting and open-circuit pulses. Thus, only when and each time a satisfactory machining pulse is detected to have occurred at the machining gap G is the discriminator 9 adapted to provide an output signal in the form of a pulse. A preset counter 10 is provided to accumulate therein signal pulses of the discriminator 9 which indicate occurrences of satisfactory machining pulses and, when the count of these pulses reaches a preset level, is reset while issuing an output signal. The latter is applied to a timer or shaping circuit 11 which is constituted, for example, by a one-shot multivibrator, to produce a command pulse which is fed into an AND gate 12. As shown, the AND gate 12 has a first input leading from the "advance" output 6b of the servo signal generator 6 and an output leading to the servo amplifier/drive stage 7. The second input of the AND gate 12 is tied to the output of the timer or shaping circuit 11 so that only in the presence of the command signal from the latter it can be enabled to pass the "advance" signal from the servo generator 6 to the amplifier/drive stage 7.

Connected in series with the EDM power supply 3, tool electrode 1 and workpiece 2 is a gap-current sensor 13, represented by a resistor 13a, for providing a voltage signal proportional to the mean machining current passing through the gap G. The output of the current sensor 13a is tied to a multi-stage discriminator or threshold circuit 14 having a plurality of threshold levels corresponding to preselected mean values of machining current and adapted, when the respective ones of these values are exceeded, to provide the corresponding switching signals which are applied to a setting unit 15 associated with the counter 10 to switch over the count levels thereof for counting the number of machining discharges.

In operation, the power supply 3 provides a succession of machining pulses across the gap G between the tool electrode 1 and the workpiece 2. The movable electrode 1 is displaced towards the workpiece 2 by means of or with a separate drive signal applied to the servo drive circuit 7 or directly to the motor 4 until a preselected machining position of the tool electrode 1 with the workpiece 2 is reached, whereupon electrical discharges commence across the machining gap G. At this point, the gate 12 is closed preventing the "advance" signal at the output 6b of the servo signal generator 6 from being passed into the drive circuit 7, thus holding the electrode 1 against further advance displacement. The electrode 1 accordingly is held standstill and successive electrical discharges continue to take place across the static machining gap G. When the machining gap G is too narrow or short-circuiting condition occurrs, the servo generator 6 provides at the output 6a a "retract" signal which is applied to the drive circuit 7 to reposition the electrode 1 and to cause the gap G to be widened to an appropriate machining spacing.

As the production of successive machining discharges progresses across the electrode gap G held standstill, the gap spacing becomes widened and the servo generator 6 provides at input 12a of the AND gate 12. In the meantime, the counter 10 counts the number of good or satisfactory gap discharges distinguished by the discriminator 9 from bad or ineffective gap pulses (e.g. short-circuit and open-circuit pulse) among successive machining pulses applied from the power supply 3 across the machining gap G and, when this number reaches a preset level established therein by the setting device 15, provides an output signal. The latter is applied to the timer or shaping circuit 11 which in turn provides a gating signal of a preselected time duration which is fed to the second input 12b of the AND gate 12. The AND gate 12 is then enabled to carry the "advance" signal already appearing or subsequently incoming through its first input 12a into the servo amplifier/drive circuit 7. The drive circuit 7 is now actuated to drive the motor 4 to allow the movable electrode 1 to be advanced to a next machining position with the workpiece 2. As noted previously, both analog and digital or step feed for repositioning the movable electrode 1 are satisfactory. In the former case, the rate and extent of feed may depend upon the analog or continuous "advance" signal issuing from the generator 6 and gated by the AND gate 6. In the latter case, either a single digital pulse or a train of digital pulses may be generated by the drive circuit 7 in response to the "advance" signal received from the AND gate 12. The digital feed is highly advantageous to assure a precision positioning and may make use of 1 micron or less increment of the displacement of the movable electrode 1 for a single drive pulse to the motor 4. Upon reestablishment of the proper machining position, the gap G allows recommencement of successive discharges to resume machining thereacross and the counter 10 which has already been reset upon the previous count-up recommences counting the discharges.

Figure 2:
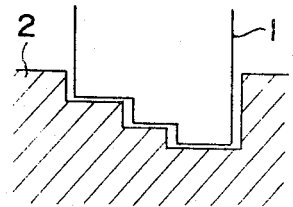
FIG. 2 is a sectional diagram diagrammatically illustrating a tool electrode and a workpiece defining an EDM gap therebetween with the area of configuration or machining varying during a machining operation with a sinking-type EDM machine.

It is desirable to set the count level of the preset counter 10 in accordance with the instantaneous area or depth of machining (FIG. 2) defined by the juxtaposed tool electrode 1 and workpiece 2 or such that the count level should be reached immediately before the frequency of satisfactory or good discharges will considerably be reduced due to an increased accumulation of machining products (i.e. chips, tar and gases) in the gap G which can be determined by the machining area of the tool and workpiece electrodes 1 and 2. When the machining area is larger, a greater number of machining discharges are permitted to occur before they contaminate the gap area or region to an excessive level. Conversely, with a smaller machining area, it will take sooner before unexcessive gap contamination develops. It is also desirable to set the count level of the preset counter 10 in accordance with the particular machining condition employed or with regard to the particular degree of surface roughness or finish desired. A rough machining requires a greater machining current than finishing. Also an automatic EDM operation may require successive changes of machining current employed in a series of steps for machining a workpiece.

The gap-current sensor 13 is accordingly used to indicate a change in the mean machining current passing between the tool electrode 1 and the workpiece 2. As the current level changes from one preset range to another, the threshold circuit 14 acts on the setting unit 15 to alter the count level of the counter 10 from one position to the next for counting up machindischarges at the gap G in accordance with the detected change in mchining area, depth, setting and/or condition. When the detection shown a reduction in machining current, the count level of the counter 10 is increased. When an increase in the current is detected, the count level is reduced.

Figure 3:
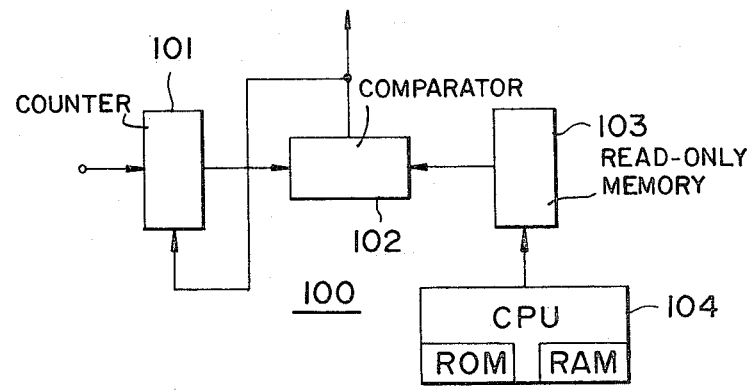
FIG. 3 is a schematic of a modification of the discharge counter employed in the present invention.

FIG. 3 shows a further embodiment of the counter unit for providing a gating signal to the AND gate 12, the unit 100 comprising a counter 101, a comparator 102, a memory device 103 such as ROM (read only memory) and a control device 104 such as a microcomputer or CPU (central processing unit). The counter may here again be a preset counter or may be a reversible or up-down counter, ripple counter or any other similar device. In this system, the number of counts of the counter 101 is applied via a decoder (not shown) to the comparator 102. When the count number coincides with a preset level established in the memory 103, the comparator 102 provides an output pulse and furnishes it to the AND gate 12. The setting at the memory 103 may be introduced manually or can be altered from one position to the next in accordance with a change in machining area, depth, setting or condition as determined by the control device 104. The control device 104 constituted by a microcomputer or central processing unit may simply be fed with one or more input signals indicating the progress of machining or calculated from a drawing of the desired machining result to allow a full automatic operation.

Figure 4:
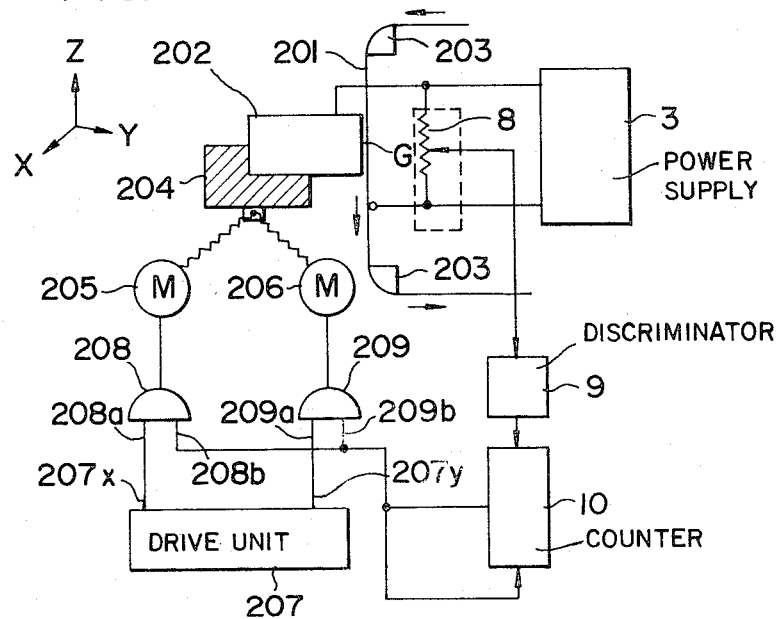
FIG. 4 is a schematic of an apparatus of the invention as embodied with a traveling-wire type EDM machine.

FIG. 4 shows an embodiment of the present invention as applied to a traveling-wire or wire-cut EDM operation when a wire 201 constituting the tool electrode is axially transported continuously between a pair of wire supports 203 from a supply to a take-up in the direction of arrow or along a Z-axis A workpiece electrode 202 juxtaposed with the traveling wire electrode 201 is supported on a worktable 204 driven by a pair of motors 205 and 206 along an X-axis and Y-axis, respectively, in the X-Y plane orthogonal to the Z-axis. As in the embodiment of FIG. 1, the EDM power supply 3 is connected to the tool electrode 201 and the workpiece 202 to apply a succession of machining pulses across the EDM gap G to remove material from the workpiece 202. As material removal proceeds, the motors 205 and 206 are driven by a servo drive unit 207 to displace the workpiece electrode 202 relative to the wire electrode fixed in its axial position along a prescribed cutting path. Typically, the input unit 207 in an NC (numerical control) unit for providing drive signals in the form of a series of pulses distributed in X-axis feed pulses and Y-axis feed pulses issuing at the outputs 207x and 207y, respectively, and applied to the motors 205 and 206, respectively, via AND gates 208 and 209.

The AND gate 208 has its output connected to the motor 205 and a first input 208a connected to the output 207x of the drive unit 207. The AND gate 209 has its output connected to the motor 206 and a first input 209a connected to the output y of the drive unit 207. The second inputs 208a and 209b of the AND gates 208 and 209 are tied together and fed with the output of the counter 10. As shown in FIG. 1, the counter 10 provides a gating signal upon counting up a preset number of machining discharges, i.e. good or satisfactory pulses, distinguished by the discriminator 9 against bad or ineffective pulses, among total pulses sensed by the sensing unit 8. The gating signal is applied through the inputs 208b and 209b to the AND gates 208 and 209 to allow the X-axis and Y-axis drive pulses to be fed to the motors 205 and 206, respectively. As a result, every advance or step forward displacement of the movable electrode 202 from each machining position to the next is assured to occur until after a predetermined number of satisfactory discharges have taken place. This number or the count-up level of the preset counter 10 is set at an optimum value here in accordance with the thickness of the workpiece 202. The count level may here as well be automatically varied during a given course of machining operation with the arrangement previously described.

While, in the foregoing embodiments, an AND gate (12; 208, 209) is used to selectively enable the output of a servo or drive signal generator (6; 207) with the output of a discharge counter (10; 100) or to provide a logical product of the outputs of the signal generator and the discharge counter for the servo or drive unit (4; 205, 206), it will be seen that an equivalent result can be obtained with an alternative arrangement in which the output of the counter (10, 100) is used to make the input of the generator operative selectively thereby and responsive to the machining gap G through the sensor 5, to provide the output signal.

Accordingly there has been described an improved method as well as a system for controlling the gap spacing between a tool and workpiece electrodes or the relative electrode displacement in a EDM machine. A highly stable and efficient machining operation is achieved thereby, owing to the fact that the movable electrode is permitted to be advanced or stepped forward from each static position only after assurance of the development of a predetermined number of satisfactory discharge machining pulses and the cycle is repetitively provided.

It will be understood that modifications and variations may be effected without departing from the scope of the novel concepts of the present invention.

What is claimed is:

1. A servo control method of controlling the gap spacing between a tool electrode and a workpiece electrode, at least one of which is movable by motor means energizable by a driver circuit, in an EDM machine including a power supply for passing machining pulses across the gap to effect a succession of machining electrical discharges between the tool and workpiece electrodes and thereby to electroerosively remove material from the workpiece electrode, the method comprising the steps of:

bringing said electrodes to a machining position to permit a succession of said machining discharges to be developed therebetween with said pulses from said power supply across said machining gap;

deriving from said machining gap, a first signal representing an enlargement of said gap spacing resulting from material removal from said workpiece electrode with said developed machining discharges while said movable electrode is held against advancement from said machining position in the forward direction;

counting said developed machining discharges between said tool and workpiece electrodes while held in said machining position and, when the counted number of machining discharges reaches a preset level, providing a second signal; and enabling the development of said first signal with said second signal and applying the developed first signal to said drive circuit, thereby operating said motor means, to permit said movable electrode to be advanced in said forward direction from said machining position to a next machining position.

2. The method defined in claim 1, further comprising the step of establishing said preset value in conjunction with the machining area defined by the confronting electrodes.

3. The method defined in claim 2 wherein the machining area varies during a cource of machining, further comprising the step of varying said preset value as a function of said machining area.

4. The method defined in claim 1 wherein said first signal is constituted by a digital signal.

5. The method defined in claim 1 wherein said first signal is constituted by an analog signal.

6. A servo system for controlling the gap spacing between a tool electrode and a workpiece electrode, at least one of which is movable by motor means energized by a drive circuit, in an EDM machine including a power supply for passing machining pulses across the gap to effect a succession of machining electrical discharges between the tool electrode and the workpiece electrode and thereby to electoerosively remove material from the workpiece electrode, the system comprising:

the motor means for bringing the electrodes to a machining position to permit a succession of the machining electrical discharges to be developed therebetween with said pulses from said supply across the machining gap;

gap sensing means for providing a first signal representing an enlargement of said gap spacing resulting from material removal from the workpiece electrode with said developed machining electrical discharges while said movable electrode is held against advancement from said machining position;

discharge counter means for counting said developed machining electrical discharges between said tool electrode and said workpiece electrode while held against advancement from said machining position and, upon the counted number of machining electrical discharges reaching a preset level, providing a second signal; and circuit means for enabling, with said second signal, said first signal to be passed to said drive circuit, thereby operating said motor means, to permit said movable electrode to be advanced from said machining position to a subsequent machining position.

7. The system defined in claim 6 wherein said first signal is a digital signal and said drive circuit is adapted to provide, in response to said digital signal, a drive signal in the form of a pulse applied to said motor means to cause said movable electrode to be advanced by one increment of displacement.

8. The system defined in claim 6 wherein said first signal is a digital signal and said drive circuit is adapted to provide, in response to said digital signal, a drive signal in the form of a train of pulses applied to said motor means to cause said movable electrode to be advanced by a succession of incremental displacements.

9. The system defined in claim 6 wherein said first signal is an analog signal representing an algebraic difference between a preset value and a magnitude variable as a function of said gap variable, and said drive circuit comprises an amplifier circuit for amplifying said analog signal applied to said motor means to cause said movable electrode to be advanced at a rate and by a distance at least partly determined by said analog signal.

10. The system defined in claim 6 wherein said discharge couonter means includes pulse detector means responsive to pulses applied from said power supply across said machining gap, discriminator means for discriminating effective pulses against ineffective pulses and a preset counter for counting the effective pulses representing said machining discharges.

11. A servo system for controlling the gap spacing between a tool electrode and a workpiece electrode, at least one of which is movable by motor means energized by a drive circuit, in an EDM machine including a power supply for passing machining pulses across the gap to effect a succession of machining electrical discharges between the tool electrode and the workpiece electrode and thereby remove material from the workpiece electrode, the system comprising:
  motor means for bringing the electrodes to a machining position to permit a succession of the electrical discharges to be developed therebetween across the machining gap;
  gap sensing means for providing a first signal representing an enlargement of the gap spacing resulting from material removal from the workpiece electrode with the electrical discharges;
  discharge counter means for counting the electrical discharges and, upon the counted number of electrical discharges reaching a present level, providing a second signal, said discharge counter means including pulse detector means responsive to pulses applied from said power supply across said machining gap, discriminator means for discriminating effective pulses against ineffective pulses and a preset counter for counting the effective pulses representing said machining discharges;
  circuit means for enabling the development of the first signal with the second signal to apply the developed first signal to the drive circuit, thereby operating the motor means, to permit the movable electrode to be advanced from the aforementioned machining position; and
  means responsive to the mean machining current passing through said gap for changing the preset count level of said counter in response to said mean machining current.

12. A servo system for controlling the gap spacing between a tool electrode and a workpiece electrode, at least one of which is movable by motor means energized by a drive circuit, in an EDM machine including a power supply for passing machining pulses across the gap to effect a succession of machining electrical discharges between the tool electrode and the workpiece electrode and thereby remove material from the workpiece electrode, the system comprising:
  motor means for bringing the electrode to a machining position to permit a succession of the electrical discharges to be developed therebetween across the machining gap;
  gap sensing means for providing a first signal representing an enlargement of the gap spacing resulting from material removal from the workpiece electrode with the electrical discharges;
  discharge counter means for counting the electrical discharges and, upon the count number of electrical discharges reaching a preset level, providing a second signal, said discharge counter means including pulse detector means responsive to pulses applied from said power supply across said machining gap, discriminator means for discriminating effective pulses against ineffective pulses and a preset counter for counting the effective pulses representing said machining discharges;
  circuit means for enabling the development of the first signal with the second signal to apply the developed first signal to the drive circuit, thereby operating the motor means, to permit the movable electrode to be advanced from the aforementioned machining position; and
  program memory and control means for changing the preset count level of said counter at values successively in a predetermined sequence.

13. A method of controlling the gap spacing between a tool electrode and a workpiece electrode, at least one of which is movable by motor means energizable by a drive circuit, in an EDM machine including a power supply for passing machining pulses across the gap to effect a succession of machining electrical discharges between the tool electrode and the workpiece electrode and thereby remove material from the workpiece electrode, the method comprising the steps of:
  bringing said electrodes to a machining position to permit a succession of the electrical discharges to be developed therebetween across said machining gap;
  providing a first signal representing an enlargement of said gap spacing resulting from material removal from said workpiece electrode with said developed electrical discharges;
  counting said electrical discharges by detecting pulses applied from said power supply across said machining gap, discriminating effective pulses against ineffective pulses and counting selectively said effective pulses representing the machining discharges, and, upon the counted number of electrical discharges reaching a preset level, providing a second signal;
  enabling the development of said first signal with said second signal and applying the developed first signal to said drive circuit, thereby operating said motor means, to permit said movable electrode to be advanced from the aforementioned machining position; and
  sensing the mean machining current passing through said gap and changing said preset count level in response to the sensed mean machining current.

14. A method of controlling the gap spacing between a tool electrode and a workpiece electrode, at least one of which is movable by motor means energizable by a drive circuit, in an EDM machine including a power supply for passing machining pulses across the gap to effect a succession of machining electrical discharges between the tool electrode and the workpiece electrode and thereby remove material from the workpiece electrode, the method comprising the steps of:
- bringing said electrodes to a machining position to permit a succession of the electrical discharges to be developed therebetween across said machining gap;
- providing a first signal representing an enlargement of said gap spacing resulting from material removal from said workpiece electrode with said developed electrical discharges;
- counting said electrical discharges by detecting pulses applied from said power supply across said machining gap, discriminating effective pulses against ineffective pulses and counting selectively said effective pulses representing the machining discharges, and, upon the counted number of electrical discharges reaching a preset level, providing a second signal;
- enabling the development of said first signal with said second signal and applying the developed first signal to said drive circuit, thereby operating said motor means, to permit said movable electrode to be advanced from the aforementioned machining position; and
- changing said preset count level at values successively in a predetermined sequence.

15. The method defined in claim 1, further comprising the steps of sensing the mean machining current passing through said gap and changing said preset count level in response to the sensed machining current.

16. The method defined in claim 1, further comprising the steps of preprogramming a plurality of values for said preset count level and changing said level at said values successively in a predetermined sequence during a course of machining operation.

17. The system defined in claim 6, further comprising means responsive to the mean machining current passing through said gap for changing the preset count level of said counter in response to said mean machining current.

18. The system defined in claim 6, further comprising program memory and control means for changing the preset count level of said counter at values successively in a predetermined sequence.

* * * * *